(12) United States Patent
Huang et al.

(10) Patent No.: US 10,814,556 B2
(45) Date of Patent: Oct. 27, 2020

(54) ADDITIVE MANUFACTURING CHAMBER, ADDITIVE MANUFACTURING MODULE AND ADDITIVE MANUFACTURING APPARATUS THEREWITH

(71) Applicant: National Chung-Shan Institute of Science and Technology, Taoyuan (TW)

(72) Inventors: Chung-Chun Huang, Taipei (TW); Chih-Peng Chen, Taoyuan (TW); Po-Shen Lin, Taoyuan (TW); Yu-Ching Tseng, Keelung (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 109 days.

(21) Appl. No.: 16/166,134

(22) Filed: Oct. 21, 2018

(65) Prior Publication Data

US 2019/0143597 A1    May 16, 2019

(30) Foreign Application Priority Data

Nov. 15, 2017 (TW) .............................. 106139392 A (51) Int. Cl.
*B29C 64/35* (2017.01)
*B33Y 30/00* (2015.01)
(Continued)

(52) U.S. Cl.
CPC ............ *B29C 64/35* (2017.08); *B22F 3/1055* (2013.01); *B29C 64/153* (2017.08); *B29C 64/25* (2017.08); *B29C 64/357* (2017.08); *B29C 64/393* (2017.08); *B33Y 30/00* (2014.12); *B33Y 40/00* (2014.12); *B33Y 50/02* (2014.12);
(Continued)

(58) Field of Classification Search
CPC ..... B29C 64/153; B29C 64/35; B29C 64/357; B29C 64/25; B22F 3/1055; B22F 2003/1059
See application file for complete search history.

(56) References Cited

U.S. PATENT DOCUMENTS

| 2004/0084814 A1 | 5/2004 | Boyd |
| 2012/0211155 A1 | 8/2012 | Wehning |

(Continued)

*Primary Examiner* — Xiao S Zhao
*Assistant Examiner* — John J Derusso
(74) *Attorney, Agent, or Firm* — Winston Hsu (57) ABSTRACT

An additive manufacturing apparatus includes a main system and a cleaning transportation system separated from the main system. The main system includes an additive manufacturing module. The additive manufacturing module includes an additive manufacturing chamber. The additive manufacturing chamber includes a powder discharging openings and a vibration unit. The powder discharging openings are formed at a lower portion of the additive manufacturing chamber, and the powders in the additive manufacturing chamber are discharged down via gravitation. The vibrational unit is for vibrating the powders so as to accelerate downward powder discharging via vibration of the vibrational unit. The present application solves the conventional problems of excessive consumed energy, large required installation and operational space, inconvenience of powder removing and swirled raised powder haze in the environment.

10 Claims, 4 Drawing Sheets

(51) Int. Cl.
    *B33Y 40/00*     (2020.01)
    *B29C 64/153*     (2017.01)
    *B22F 3/105*     (2006.01)
    *B29C 64/357*     (2017.01)
    *B29C 64/25*     (2017.01)
    *B29C 64/245*     (2017.01)
    *B29C 64/371*     (2017.01)
    *B33Y 50/02*     (2015.01)
    *B29C 64/393*     (2017.01)

(52) U.S. Cl.
    CPC ... *B22F 2003/1059* (2013.01); *B22F 2999/00* (2013.01); *B29C 64/245* (2017.08); *B29C 64/371* (2017.08)

(56) References Cited

U.S. PATENT DOCUMENTS

| | | | |
|---|---|---|---|
| 2016/0016768 A1* | 1/2016 | Karleskint | B66F 17/00 |
| | | | 254/133 R |
| 2016/0067781 A1 | 3/2016 | Kawada | |
| 2016/0318253 A1 | 11/2016 | Barnhart | |
| 2017/0136543 A1 | 5/2017 | Hermann | |
| 2020/0061915 A1* | 2/2020 | Pawliczek | B22F 3/1055 |

\* cited by examiner

FIG. 8

ADDITIVE MANUFACTURING CHAMBER, ADDITIVE MANUFACTURING MODULE AND ADDITIVE MANUFACTURING APPARATUS THEREWITH

BACKGROUND OF THE INVENTION

1. Field of the Invention

The invention relates to an additive manufacturing application, and more particularly, to an additive manufacturing chamber with convenience of removing remainder powders in the additive manufacturing chamber and to an additive manufacturing module and an additive manufacturing apparatus therewith.

2. Description of the Prior Art

Concerning cleaning an additively manufactured work-piece buried in unprocessed powders filling an additive manufacturing chamber for the additive manufacturing after the additive manufacturing process is finished, one of the conventional methods is to lift and expose the work-piece and a manufacturing platform, whereon the work-piece is shaped and disposed, out from the additive manufacturing chamber so as to collapse the accumulated chunk of powders once exposed, before utilizing a vacuum cleaner or a brush to manually remove the remainder powders on and surrounding the work-piece.

Another one of the conventional methods is to pour out the powders in the additive manufacturing chamber by rotating and overturning the entire additive manufacturing chamber, before utilizing a vacuum cleaner or a brush to manually remove the remainder powders on and surrounding the work-piece. Another conventional method is to disassemble an assembled additive manufacturing chamber so that the powders and the work-piece can be directly drawn out.

However, in the first conventional method of removing the powders by lifting the work-piece and the platform in the additive manufacturing chamber, the manufacturing platform along with the work-piece has to be lifted to a level where at least the surface of the manufacturing platform is exposed from the upper edge of the additive manufacturing chamber so that the chunk of powders can be effectively removed, which not only leads to problems of long elevating distance, excessively consumed energy and tedious cleaning task but also exposes the environment and on-site equipment such as a laser head with a protective glass cover to a risk of being contaminated by the spreading raised powder haze.

As for the second conventional method of removing the powders by overturning the entire additive manufacturing chamber, large amount of energy and space are required for the overturning process, and the work-piece is prone to be deformed by compression due to unbalanced powder distribution, not to mention that the work-piece or a supportive structure for the additive manufacturing chamber is prone to a risk of breakage due to dead weight of the work-piece or centrifugal force arising from the overturning process. As for the third conventional method of removing the powders by disassembling an assembled additive manufacturing chamber, sudden discharge of the powders might happen when the additive manufacturing chamber is being disassembled, which perplexes the cleaning task and spreads the raised powder haze around the environment, not to mention a risk of powder explosion in such an environment.

SUMMARY OF THE INVENTION

Therefore, it is an objective of the present application to provide an additive manufacturing chamber with convenience of removing remainder powders in the additive manufacturing chamber.

It is another objective of the present application to provide an additive manufacturing module with the abovementioned additive manufacturing chamber.

It is another objective of the present application to provide an additive manufacturing apparatus with the abovementioned additive manufacturing module or the additive manufacturing chamber.

To achieve the aforementioned objectives, the present application discloses an additive manufacturing chamber which includes at least one side wall, a heating base, a manufacturing platform, and a restraining member. A plurality of powder discharging openings are formed at a lower portion of the at least one side wall. The heating base is disposed substantially at a center of a bottom portion of the additive manufacturing chamber. The manufacturing platform is disposed above the heating base. The restraining member is disposed on the at least one side wall and for restraining the manufacturing platform from moving downwards so that a space above the manufacturing platform does not communicate with the plurality of powder discharging openings to prevent powders disposed in the space from discharging through the plurality of powder discharging openings. When the restraining member is removed to allow the manufacturing platform to move downwards, the space above the manufacturing platform is allowed to communicate with the plurality of powder discharging openings so that the powders in the space are discharged by gravitation through the plurality of powder discharging openings.

The additive manufacturing chamber further includes a vibrational unit for vibrating the powders disposed in the space so as to accelerate downward powder discharging via vibration of the vibrational unit.

According to an embodiment of the present application, the plurality of powder discharging openings are downwardly inclined and face towards an outside of the additive manufacturing chamber.

The present application further provides an additive manufacturing module which includes the abovementioned additive manufacturing chamber, at least one first temporary storage trough, and at least one first lifting unit. The at least one first temporary storage trough is disposed below the additive manufacturing chamber. The at least one first lifting unit is disposed below the additive manufacturing chamber and for lifting and lowering the manufacturing platform and the heating base. When the at least one first lifting unit lowers the manufacturing platform and the heating base to a position lower than the plurality of powder discharging openings, the space above the manufacturing platform communicates with the plurality of powder discharging openings so that the powders in the space are discharged by gravitation through the plurality of powder discharging openings into the at least one first temporary storage trough.

The present application further provides an additive manufacturing apparatus which includes a main system. The main system includes a fabrication subsystem, an energy supplying subsystem, an environment modulating subsystem, and a controlling subsystem. The fabrication subsystem includes the abovementioned manufacturing module. The energy supplying subsystem supplies a high energy beam for sintering or fusing surfaces of the powders via a scanning heating process. The environment modulating subsystem is for transporting gas into the fabrication subsystem and controlling an atmosphere in the fabrication subsystem. The controlling subsystem is for controlling operations of the energy supplying subsystem, the environment modulating subsystem, and the fabrication subsystem.

The present application further provides another additive manufacturing apparatus which includes a main system and a cleaning transportation. The main system includes a fabrication subsystem, an energy supplying subsystem, an environment modulating subsystem, a controlling subsystem. The fabrication subsystem includes the abovementioned manufacturing module and at least one first lifting unit. The at least one first lifting unit is disposed below the additive manufacturing chamber and for lifting and lowering the manufacturing platform and the heating base. The energy supplying subsystem supplies a high energy beam for sintering or fusing surfaces of the powders via a scanning heating process. The environment modulating subsystem is for transporting gas into the fabrication subsystem and controlling an atmosphere in the fabrication subsystem. The controlling subsystem is for controlling operations of the energy supplying subsystem, the environment modulating subsystem, and the fabrication subsystem. The cleaning transportation system is separated from the main system and includes a work-piece transporting subsystem, a cleaning subsystem. The work-piece transporting subsystem includes a transportation module for transporting the additive manufacturing chamber out of or into the main system. The cleaning subsystem includes a cleaning hanging module, a second lifting unit and a second temporary storage trough. The second temporary storage trough is disposed below the transported additive manufacturing chamber. The second lifting unit is for lifting and lowering the manufacturing platform and the heating base so that the powders are capable of being discharged by gravitation into the second temporary storage trough when the restraining member is removed to allow the second lifting unit to lower the manufacturing platform and the heating base to a position where the space above the manufacturing platform communicates with the plurality of powder discharging openings. The cleaning hanging module is for cleaning a work-piece in the additive manufacturing chamber by hanging and rotating the manufactured work-piece after finishing discharging the powders. After the additive manufacturing is finished, the manufacturing chamber is transported by the transportation module to the cleaning subsystem, and the downward movements of the heating base and the manufacturing platform are restrained by the restraining member so that the space above the manufacturing platform does not communicate with the plurality of powder discharging openings to prevent the powders disposed in the space from discharging through the plurality of powder discharging openings when the additive manufacturing chamber is transported to the cleaning subsystem by the transportation module and disposed on the second lifting unit.

According to an embodiment of the present application, the cleaning hanging module separates the powders adhering to the work-piece via gravitation by hanging and rotating the work-piece.

According to an embodiment of the present application, the cleaning hanging apparatus comprises at least one cleaning device for removing the powders adhering to the work-piece.

According to an embodiment of the present application, the at least one cleaning device is a vacuum cleaner, a brush, or a pneumatic gun.

According to an embodiment of the present application, the fabrication subsystem of the main system further comprises a first temporary storage trough disposed below the additive manufacturing chamber and for containing the discharged powders.

In conclusion, the additive manufacturing chamber, the additive manufacturing module, and the additive manufacturing apparatus provided by the present application utilizes gravitation to efficiently discharge down the remainder powders in the additive manufacturing chamber and to separate the powders from the finished work-pieces made by additive manufacturing, which solves the conventional problems of excessive consumed energy, large required installation and operational space, inconvenience of powder removing and swirled raised powder haze in the environment, and the complicated cleaning task after the additive manufacturing. In addition, since the work-pieces of the present application can be remained in the additive manufacturing chamber and directly transported to a next work step during and after finishing the powder removing process, possible damages to the work-pieces in a conventional cleaning process due to delivery of the work-pieces can be avoided. In contrast to the prior art, the additive manufacturing chamber requires less structural components and provides better manufacturing and operational features. Therefore, the present application not only has an advantage of versatility but also reduces costs in additive manufacturing procedure, equipment, time and manpower.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
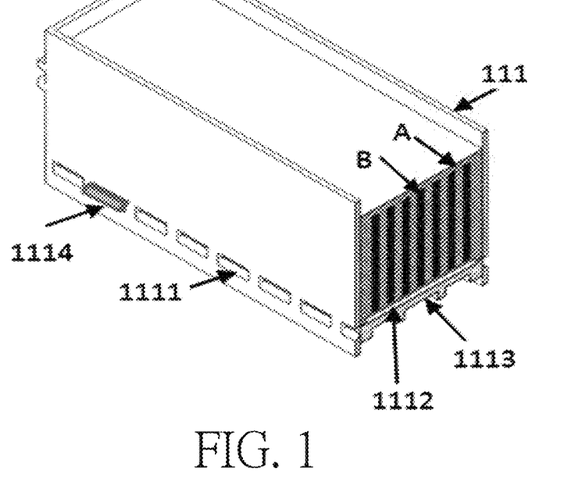
FIG. 1 is a diagram of an additive manufacturing chamber according to an embodiment of the present application.
Figure 2:
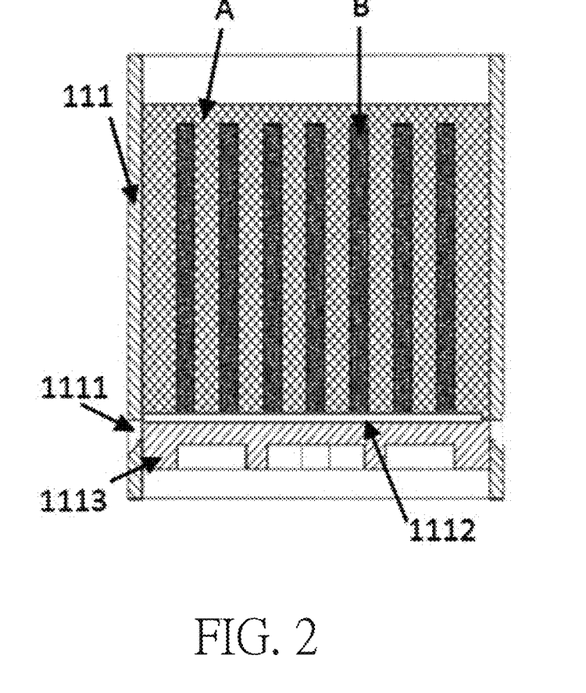
FIG. 2 is a diagram illustrating powder discharging openings of the additive manufacturing chamber according to the embodiment of the present application.

Please refer to FIG. 1 and FIG. 2. FIG. 1 is a diagram of an additive manufacturing chamber 111 according to an embodiment of the present application. FIG. 2 is a diagram illustrating powder discharging openings 1111 of the additive manufacturing chamber 111 according to the embodiment of the present application. The additive manufacturing chamber 111 for additive manufacturing, which is adopted in an additive manufacturing apparatus for additive manufacturing, is shown in FIG. 1. A heating base 1113 is disposed inside the additive manufacturing chamber 111 and substantially at a center of a bottom portion of the additive manufacturing chamber 111. A manufacturing platform 1112 is disposed above the heating base 1113. A plurality of powder discharging openings 1111 are formed at a lower portion of at least one of side walls of the additive manufacturing chamber 111 below a midpoint of the at least one of side walls. One or two restraining members 1114 are disposed on each of two side walls of, specifically to each of the left and right side walls of, the additive manufacturing chamber 111. The restraining members 1114 can restrain the manufacturing platform 1112 and the heating base 1113 from moving downwards so that a space above the manufacturing platform 1112 does not communicate with the plurality of powder discharging openings 1111 to prevent powders A disposed in the space from discharging through the plurality of powder discharging openings 1111. Besides, when the plurality of restraining members 1114 is removed to allow the manufacturing platform 1112 and the heating base 1113 to move downwards, the space above the manufacturing platform 1112 is allowed to communicate with the plurality of powder discharging openings 1111 so that the powders A in the space can be discharged by gravitation through the plurality of powder discharging openings 1111.

Figure 5:
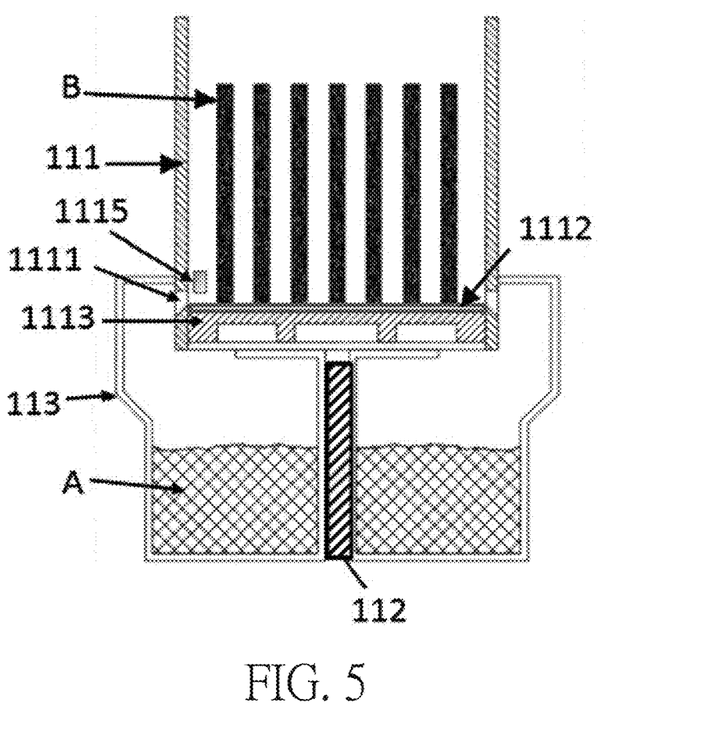
FIG. 5 is a diagram illustrating the additive manufacturing chamber finishing powder discharging according to the embodiment of the present application.

Please refer to FIG. 1, FIG. 2, and FIG. 5. FIG. 5 is a diagram illustrating the additive manufacturing chamber 111 finishing powder discharging according to the embodiment of the present application. The plurality of powder discharging openings 1111 can be horizontally oriented, but not limited to this. According to a preferred embodiment, the powder discharging openings 1111 can be downwardly inclined and face towards an outside of the additive manufacturing chamber 111 for enhancing powder discharging effect. In addition, in order to further enhance the powder discharging effect, a vibrational unit 1115 for vibrating the powders A can be disposed in the additive manufacturing chamber 111 and, preferably, adjacent to the powder discharging opening 1111 at the bottom portion of the additive manufacturing chamber 111. Therefore, the downward powder discharging can be accelerated via vibration of the vibrational unit 1115.

Figure 3:
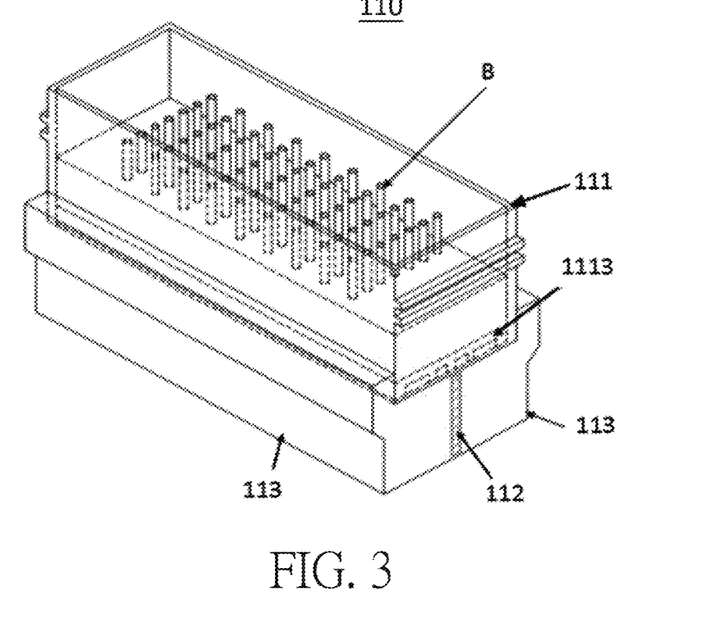
FIG. 3 is a perspective diagram of an additive manufacturing module according to an embodiment of the present application.

Please refer to FIG. 2 and FIG. 3. FIG. 3 is a perspective diagram of an additive manufacturing module 110 according to an embodiment of the present application. As shown in FIG. 3, the present application further provides the additive manufacturing module 110 which includes the additive manufacturing chamber 111, one or more first lifting units 112, and one or more first temporary storage troughs 113. The first lifting unit 112 is disposed below the additive manufacturing chamber 111 and for lifting and lowering the manufacturing platform 1112 and the heating base 1113. The first temporary storage trough 113 is disposed below the additive manufacturing chamber 111. It should be noticed that, in another embodiment of the present application, a plurality of first temporary storage troughs 113 can be disposed below the additive manufacturing chamber 111 and at two opposite sides (left and right sides) of the first lifting unit 112, but not limited to this.

Figure 4:
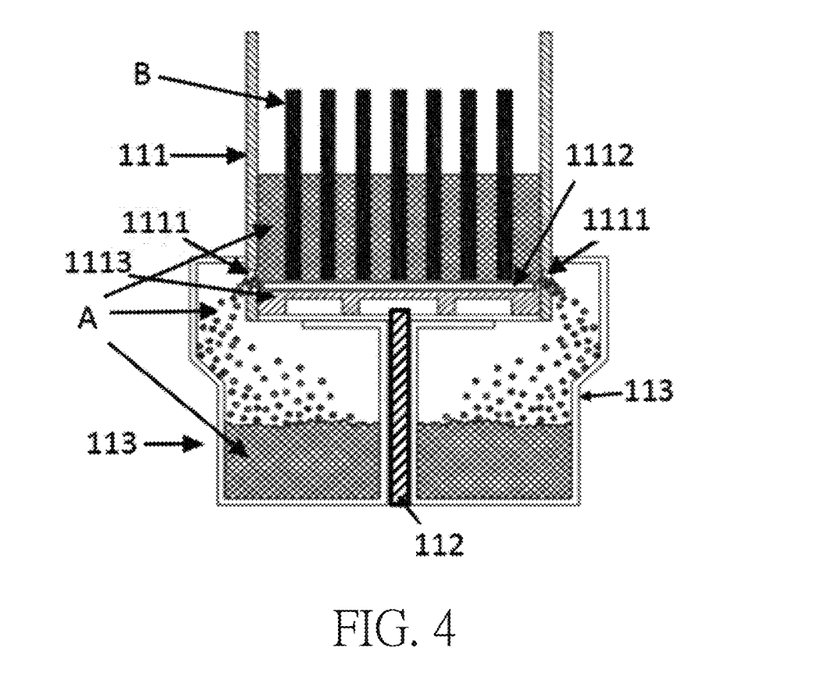
FIG. 4 is a diagram illustrating the additive manufacturing chamber discharging the powders according to the embodiment of the present application.

Please refer to FIG. 4 and FIG. 5. FIG. 4 is a diagram illustrating the additive manufacturing chamber 111 discharging the powders according to the embodiment of the present application. When the restraining members 1114 are removed to open positions, the first lifting unit 112 can lower the manufacturing platform 1112 and the heating base 1113 to a position lower than the plurality of powder discharging openings 1111, and thereby the space above the manufacturing platform 1112 communicates with the plurality of powder discharging openings 1111 so that the powders A in the space can be discharged by gravitation through the plurality of powder discharging openings 1111 into the first temporary storage trough 113 below. After finishing the powder discharging, the powders A have all fallen into the first temporary storage trough 113, while a work-pieces B still remain in the additive manufacturing chamber 111.

Figure 6:
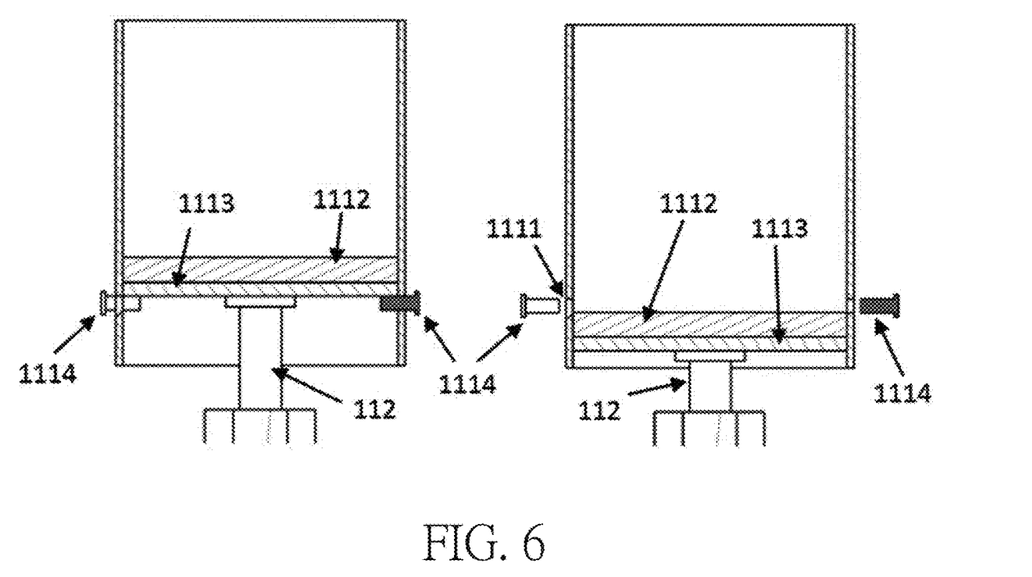
FIG. 6 is a diagram illustrating configuration and operation of restraining members according to the embodiment of the present application.

Please refer to FIG. 6. FIG. 6 is a diagram illustrating configuration and operation of the restraining members 1114 according to the embodiment of the present application. According to a preferred embodiment, most of the plurality of powder discharging openings 1111 are downwardly inclined and face towards an outside of the side walls of the additive manufacturing chamber 111 for enhancing the powder discharging effect, while the rest of the plurality of powder discharging openings 1111 are horizontally oriented so that the restraining members 1114 can be inserted into the horizontally oriented powder discharging openings 1111 and prevent the heating base 1113 and the manufacturing platform 1112 from moving downwards towards a position lower than the plurality of powder discharging openings 1111. When the restraining members 1114 are removed (or pulled out), the manufacturing platform 1112 and the heating base 1113 can be lowered to a position lower than the plurality of powder discharging openings 1111 so that the space above the manufacturing platform 1112 communicates with the plurality of powder discharging openings 1111 to discharge the powders in the space. The additive manufacturing chamber 111 or the additive manufacturing module 110 of the present application utilizes gravitation to discharge the powders down to the first temporary storage trough 113, which reduces consumed energy and swirled raised powder haze.

Figure 7:
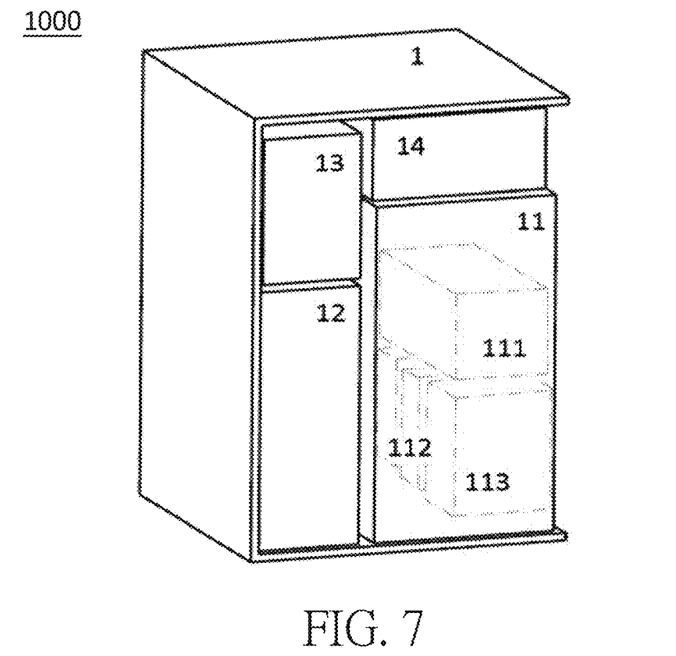
FIG. 7 is a diagram of an additive manufacturing apparatus according to an embodiment of the present application.

Please refer to FIG. 7. FIG. 7 is a diagram of an additive manufacturing apparatus 1000 according to an embodiment of the present application. The present application further provides the additive manufacturing apparatus 1000 which includes a main system 1, and the main system 1 includes a controlling subsystem 13, an energy supplying subsystem 14, an environment modulating subsystem 12, and a fabrication subsystem 11. The fabrication subsystem 11 includes the additive manufacturing chamber 111, the first lifting unit 112, and the first temporary storage trough 113. It should be noticed that the additive manufacturing chamber 111, the first lifting unit 112, and the first temporary storage trough 113 compose the additive manufacturing module 110 of the previous embodiment. The energy supplying subsystem 14 supplies a high energy beam, such as a laser beam or an electronic beam, for sintering or fusing surfaces of the powders via a scanning heating process. The environment modulating subsystem 12 transports gas into the fabrication subsystem 11 and controls an atmosphere in the fabrication subsystem 11. The controlling subsystem 13 controls operations of the energy supplying subsystem 14, the environment modulating subsystem 12, and the fabrication subsystem 11.

The embodiment of the additive manufacturing apparatus shown in FIG. 7 can be regarded as an independent additive manufacturing apparatus. The first lifting unit 112 for lifting and lowering the manufacturing platform 1112 and the heating base 1113 in the additive manufacturing chamber 111 is disposed below the additive manufacturing chamber 111. When the sintering or fusion process is performed, the manufacturing platform 1112 and the heating base 1113 can be correspondingly lowered by the first lifting unit 112 but are prevented by the restraining members 1114 from moving downwards towards a position where a space above the manufacturing platform 112 communicates with the plurality of powder discharging openings 1111. After finishing the sintering or fusion process, the restraining members 1114 can be removed and the first lifting unit 112 of the fabrication subsystem 11 can lower the manufacturing platform 1112 and the heating base 1113 to a position lower than the plurality of powder discharging openings 1114 so that the space above the manufacturing platform 1112 communicates with the plurality of powder discharging openings 1114 for the powders in the space to be discharged by gravitation through the plurality of powder discharging openings 1111 down to the inside of the first temporary storage trough 113. After the powders are discharged, the work-pieces B can be drawn out of the additive manufacturing chamber 111.

Figure 8:
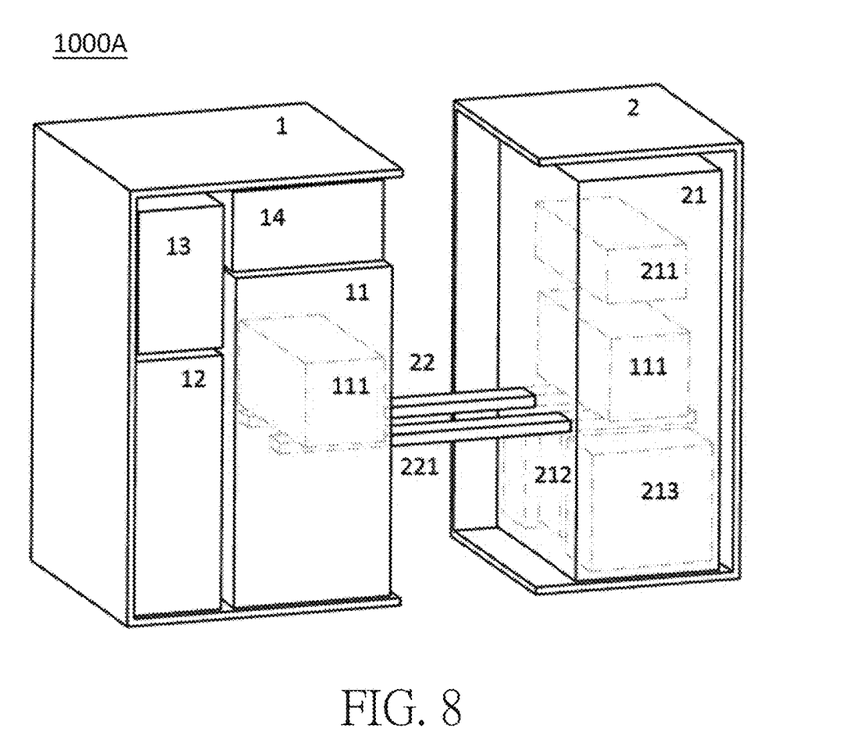
FIG. 8 is a diagram of an additive manufacturing apparatus according to another embodiment of the present application.

Please refer to FIG. 8. FIG. 8 is a diagram of an additive manufacturing apparatus 1000A according to another embodiment of the present application. The additive manufacturing apparatus 1000A includes the main system 1 and the cleaning transportation system 2, and the cleaning transportation system 2 is separated from the main system 1. The main system 1 includes the controlling subsystem 13, the energy supplying subsystem 14, the environment modulating subsystem 12, and the fabrication subsystem 11. Since the controlling subsystem 13, the energy supplying subsystem 14 and the environment modulating subsystem 12 of this embodiment have the same structural designs and operational principles as ones of the previous embodiment, detailed description thereof is omitted here for simplicity. The fabrication system 11 of this embodiment includes the additive manufacturing chamber 111 and the first lifting unit 112 disposed below the additive manufacturing chamber 111 and for lifting and lowering the manufacturing platform 1112 and the heating base 1113. It should be noticed that the fabrication subsystem 11 can further include the first temporary storage trough 113 disposed below the additive manufacturing chamber 111 and for containing the discharged powders, but not limited to this.

As shown in FIG. 8, the cleaning transportation system 2 includes a work-piece transporting subsystem 22 and a cleaning subsystem 21, and the work-piece transporting subsystem 22 includes a transportation module 221. The transportation module 221 is for transporting the additive manufacturing chamber 111 from the fabrication subsystem 11 to the cleaning subsystem 21 (and vice versa). The cleaning subsystem 21 includes a cleaning hanging module 211, a second lifting unit 212, and a second temporary storage trough 213. After finishing the additive manufacturing, the transportation module 221 can transport the additive manufacturing chamber 111 from the fabrication subsystem 11 to the cleaning subsystem 21, and then the additive manufacturing chamber 111 can be supported by the second lifting unit 212 of the cleaning subsystem 21. That is, the second lifting unit 212 is below the transported additive manufacturing chamber 111, and the transported additive manufacturing chamber 111 can be supported by the second lifting unit 212 from below. The second temporary storage trough 213 is disposed below the transported additive manufacturing chamber 111. In another embodiment of the present application, a plurality of second temporary storage troughs 213 can be disposed below the additive manufacturing chamber 111 and at two opposite sides (left and right sides) of the second lifting unit 212, but not limited to this. The second lifting unit 212 can lower or lift the manufacturing platform 1112 and the heating base 1113 of the additive manufacturing chamber 111. When the restraining members 1114 are removed to an open position, the second lifting unit 212 can lower the manufacturing platform 1112 and the heating base 1113 to a position where the space above the manufacturing platform 1112 communicates with the plurality of powder discharging openings 1111 so that the powders in the space can be discharged from the additive manufacturing chamber 111 down to the inside of the second temporary storage trough 213 below. After the powders in the additive manufacturing chamber 111 have been discharged, the cleaning hanging module 211 cleans the work-pieces B in the additive manufacturing chamber by hanging and rotating the additively manufactured work-pieces B.

The cleaning hanging module 211 can separate the powders adhering to the work-pieces B via gravitation by hanging and rotating the work-pieces B, but not limited to this. According to another embodiment of the present application, one or more cleaning devices, such as vacuum cleaners, brushes, pneumatic gun or air blowing guns, can be disposed in the cleaning hanging module 211 for removing the powders adhering to the work-pieces B. Besides, it should be noticed that when the additive manufacturing chamber 111 is being transported by the transportation module 221 from the fabrication subsystem 11 to the cleaning subsystem 21 and disposed onto the second lifting unit 212 after finishing the additive manufacturing, the downward movements of the heating base 1113 and the manufacturing platform 1112 are restrained by the restraining members 1114 so that the space above the manufacturing platform 1112 does not communicate with the plurality of powder discharging openings 1111. Thereby, the powders can be prevented from swirling and leaking out of the additive manufacturing chamber 111 when the powders are not yet to be discharged.

In conclusion, the additive manufacturing chamber, the additive manufacturing module, and the additive manufacturing apparatus provided by the present application utilizes gravitation to efficiently discharge down the remainder powders in the additive manufacturing chamber and to separate the powders from the finished work-pieces made by additive manufacturing, which solves the conventional problems of excessive consumed energy, large required installation and operational space, inconvenience of powder removing and swirled raised powder haze in the environment, and the complicated cleaning task after the additive manufacturing. In addition, since the work-pieces of the present application can be remained in the additive manufacturing chamber and directly transported to a next work step during and after finishing the powder removing process, possible damages to the work-pieces in a conventional cleaning process due to delivery of the work-pieces can be avoided. In contrast to the prior art, the additive manufacturing chamber requires less structural components and provides better manufacturing and operational features. Therefore, the present application not only has an advantage of versatility but also reduces costs in additive manufacturing procedure, equipment, time and manpower.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An additive manufacturing chamber comprising:
   at least one side wall, a plurality of powder discharging openings being formed at a lower portion of the at least one side wall below a midpoint of the at least one side wall;
   a heating base disposed at a center of a bottom portion of the additive manufacturing chamber;
   a manufacturing platform disposed above the heating base; and
   a restraining member disposed on the at least one side wall and for restraining the manufacturing platform from moving downwards so that a space above the manufacturing platform does not communicate with the plurality of powder discharging openings to prevent powders disposed in the space from discharging through the plurality of powder discharging openings;
   wherein when the restraining member is removed to allow the manufacturing platform to move downwards, the space above the manufacturing platform is allowed to communicate with the plurality of powder discharging openings so that the powders in the space are discharged by gravitation through the plurality of powder discharging openings.

2. The additive manufacturing chamber of claim 1, further comprising a vibrational unit for vibrating the powders disposed in the space so as to accelerate downward powder discharging via vibration of the vibrational unit.

3. The additive manufacturing chamber of claim 1, wherein the plurality of powder discharging openings are downwardly inclined and face towards an outside of the additive manufacturing chamber.

4. An additive manufacturing module comprising:
   the additive manufacturing chamber of claim 1;
   at least one first temporary storage trough disposed below the additive manufacturing chamber; and
   at least one first lifting unit disposed below the additive manufacturing chamber and for lifting and lowering the manufacturing platform and the heating base;
   wherein when the at least one first lifting unit lowers the manufacturing platform and the heating base to a position lower than the plurality of powder discharging openings, the space above the manufacturing platform communicates with the plurality of powder discharging openings so that the powders in the space are discharged by gravitation through the plurality of powder discharging openings into the at least one first temporary storage trough.

5. An additive manufacturing apparatus comprising a main system, and the main system comprising:
   a fabrication subsystem comprising the manufacturing module of claim 4;
   an energy supplying subsystem supplying a high energy beam for sintering or fusing surfaces of the powders via a scanning heating process;
   and
   a controlling subsystem for controlling operations of the energy supplying subsystem and the fabrication subsystem.

6. An additive manufacturing apparatus comprising:
   a main system comprising:
      a fabrication subsystem comprising the additive manufacturing chamber of claim 1 and at least one first lifting unit, the at least one first lifting unit being disposed below the additive manufacturing chamber and for lifting and lowering the manufacturing platform and the heating base;
      an energy supplying subsystem supplying a high energy beam for sintering or fusing surfaces of the powders via a scanning heating process;
      and
      a controlling subsystem for controlling operations of the energy supplying subsystem and the fabrication subsystem;
   a cleaning transportation system separated from the main system, the cleaning transportation system comprising:
      a work-piece transporting subsystem comprising a transportation module for transporting the additive manufacturing chamber out of or into the main system; and
      a cleaning subsystem comprising a second lifting unit and a second temporary storage trough, the second temporary storage trough being disposed below the transported additive manufacturing chamber, the second lifting unit being for lifting and lowering the manufacturing platform and the heating base so that the powders are capable of being discharged by gravitation into the second temporary storage trough when the restraining member is removed to allow the second lifting unit to lower the manufacturing platform and the heating base to a position where the space above the manufacturing platform communicates with the plurality of powder discharging openings, and the cleaning subsystem being for cleaning a work-piece in the additive manufacturing chamber by hanging and rotating the manufactured work-piece after finishing discharging the powders;
   wherein after additive manufacturing is finished, the additive manufacturing chamber is transported by the transportation module to the cleaning subsystem, and downward movements of the heating base and the manufacturing platform are restrained by the restraining member so that the space above the manufacturing platform does not communicate with the plurality of powder discharging openings to prevent the powders disposed in the space from discharging through the plurality of powder discharging openings when the additive manufacturing chamber is transported to the cleaning subsystem by the transportation module and disposed on the second lifting unit.

7. The additive manufacturing apparatus of claim 6, wherein the cleaning subsystem separates the powders adhering to the work-piece via gravitation by hanging and rotating the work-piece.

8. The additive manufacturing apparatus of claim 6, wherein the cleaning subsystem comprises at least one cleaning device for removing the powders adhering to the work-piece.

9. The additive manufacturing apparatus of claim 8, wherein the at least one cleaning device is a vacuum cleaner, a brush, or a pneumatic gun.

10. The additive manufacturing apparatus of claim 6, wherein the fabrication subsystem of the main system further comprises a first temporary storage trough disposed below the additive manufacturing chamber and for containing the powders discharged from the plurality of powder discharging openings.

\* \* \* \* \*